US 8,285,610 B2

(12) United States Patent
Engle et al.

(10) Patent No.: US 8,285,610 B2
(45) Date of Patent: Oct. 9, 2012

(54) SYSTEM AND METHOD OF DETERMINING THE QUALITY OF ENHANCED TRANSACTION DATA

(75) Inventors: Traci Engle, Dublin, CA (US); Amr Alghussain, Hayward, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/411,998

(22) Filed: Mar. 26, 2009

(65) Prior Publication Data

US 2009/0248550 A1 Oct. 1, 2009

Related U.S. Application Data

(60) Provisional application No. 61/040,104, filed on Mar. 27, 2008.

(51) Int. Cl.
*G07B 17/00* (2006.01)

(52) U.S. Cl. ............... 705/30; 705/2; 705/36; 705/35; 705/44; 705/1; 705/38; 705/52; 705/10; 705/64; 705/31; 705/13; 705/7; 705/11; 705/14; 705/24; 705/39; 705/27

(58) Field of Classification Search ............... 705/30
See application file for complete search history.

(56) References Cited

U.S. PATENT DOCUMENTS

| 6,154,729 | A | 11/2000 | Cannon et al. |
| 7,076,475 | B2 | 7/2006 | Honarvar |
| 2002/0198798 | A1 | 12/2002 | Ludwig et al. |
| 2003/0105711 | A1* | 6/2003 | O'Neil ............... 705/39 |
| 2003/0110136 | A1* | 6/2003 | Wells et al. ............... 705/64 |
| 2004/0107123 | A1 | 6/2004 | Haffner et al. |
| 2004/0181493 | A1 | 9/2004 | Cross et al. |
| 2005/0119955 | A1 | 6/2005 | Dang et al. |
| 2005/0222929 | A1 | 10/2005 | Steier et al. |
| 2006/0253289 | A1 | 11/2006 | Kymal et al. |
| 2007/0192242 | A1* | 8/2007 | Kunz ............... 705/38 |
| 2007/0219865 | A1 | 9/2007 | Leining |
| 2008/0059335 | A1 | 3/2008 | Tenorio et al. |

OTHER PUBLICATIONS

Arasli, Huseyin Katircioglu, Salih Turan Mehtap-Smadi, Salime. A comparison of service quality in the banking industry: Some evidence from Turkish- and Greek-speaking areas in Cyprus. 2005, International Journal of Bank Marketing, v23n6/7, p. 508-526.*
PCT International Search Report for PCT/US09/38434 dated May 8, 2009.
PCT Written Opinion corresponding to PCT/US09/38434 mailed May 8, 2009.
International Preliminary Report on Patentability corresponding to PCT/US09/38434 issued Sep. 28, 2010.

* cited by examiner

*Primary Examiner* — F. Zeender
*Assistant Examiner* — Fawaad Haider
(74) *Attorney, Agent, or Firm* — Chadbourne & Parke LLP; Walter G. Hanchuk (57) ABSTRACT

A system is provided for determining the quality of merchant supplied enhanced data related to financial transactions performed by holders of financial presentation devices such as credit cards. The system includes a memory storing a plurality of enhanced transaction data (ETD) records and quality check criteria for determining the quality of enhanced data contained in the ETD records. A quality determination module determines a quality of the stored ETD records based on the stored quality check criteria.

24 Claims, 7 Drawing Sheets

| Acquirer_Name | Acquirer_Bin | L2_Count | L3_Count | L2_L% | L2_M% | L2_H% | L3_L% | L3_M% | L3_H% |
|---|---|---|---|---|---|---|---|---|---|
| 1ST SUMMIT BANK | 491019 | 14 | 0 | 0 | 92.857 | 7.143 | N/A | N/A | N/A |
| ABN AMRO BANK N.V. | 429777 | 13 | 13 | 0 | 100 | 0 | 0 | 84.615 | 15.385 |
| ABN AMRO BANK N.V. | 430245 | 11 | 11 | 0 | 100 | 0 | 0 | 0 | 100 |
| ABN AMRO BANK N.V. | 430250 | 1 | 1 | 0 | 100 | 0 | 0 | 0 | 100 |
| ABN AMRO BANK N.V. | 448521 | 765 | 747 | 0 | 65.359 | 34.64 | 0 | 99.465 | 0.535 |
| ACB CARD SERVICES, INC. | 430197 | 378 | 0 | 0 | 93.386 | 6.614 | N/A | N/A | N/A |
| ADUNO S.A. | 495051 | 17,569 | 1,677 | 17.605 | 82.395 | 0 | 0 | 47.227 | 52.773 |
| AIB BANK | 402344 | 45 | 0 | 4.444 | 95.556 | 0 | N/A | N/A | N/A |
| AIB BANK | 402345 | 2 | 0 | 0 | 100 | 0 | N/A | N/A | N/A |
| AIB GROUP (UK) P.L.C. | 474202 | 4 | 0 | 50 | 50 | 0 | N/A | N/A | N/A |
| ALPINE BANK | 480687 | 3,093 | 2,348 | 0 | 90.85 | 9.15 | 0 | 0 | 100 |

FIG. 6

| Commodity | Service | Data Category | Quality Ranking | | |
|---|---|---|---|---|---|
| | | | Low | Medium | High |
| T & E | Airline | Level II | 21.4% | 78.6% | 0.0% |
| | | Level III Summary | 0.00% | 100.00% | 0.00% |
| | | Level III Detail | 4.80% | 37.71% | 57.49% |
| | Hotel | Level II | 0.00% | 100.00% | 0.00% |
| | | Level III | 32.76% | 67.24% | 0.00% |
| | Car Rentals | Level II | 0.00% | 100.00% | 0.00% |
| | | Level III | 0.00% | 0.00% | 0.00% |
| Retail | General Retail | Level II | 0.00% | 0.00% | 100.00% |
| | | Level III Summary | 0.00% | 0.00% | 100.00% |
| | | Level III Detail | 0.00% | 0.00% | 100.00% |
| | Temporary Help Services | Level II | | | |
| | | Level III | 0.00% | 0.00% | 100.00% |
| | Shipping & Overnight Courier Services | Level II | | | |
| | | Level III | 0.00% | 0.00% | 100.00% |
| | Fleet - Fuel | Level II | 0.00% | 0.00% | 100.00% |
| | | Level III | 0.00% | 0.00% | 100.00% |
| | Fleet - Fuel & Non-Fuel | Level II | 0.00% | 0.00% | 100.00% |
| | | Level III Summary | 0.00% | 0.00% | 100.00% |
| | | Level III Detail | 0.00% | 0.00% | 100.00% |
| | Fleet Non-Fuel | Level II | 0.00% | 0.00% | 100.00% |
| | | Level III Summary | 0.00% | 0.00% | 100.00% |
| | | Level III Detail | 0.00% | 0.00% | 100.00% |

F I G. 7

SYSTEM AND METHOD OF DETERMINING THE QUALITY OF ENHANCED TRANSACTION DATA

CROSS-REFERENCE TO RELATED APPLICATIONS

This application claims the benefit of priority under 35 U.S.C. §119 to commonly owned and assigned U.S. provisional patent application Ser. No. 61/040,104, filed on Mar. 27, 2008 and entitled "SYSTEM AND METHOD FOR MEASURING THE QUALITY OF MERCHANT SUPPLIED FINANCIAL TRANSACTION DATA", which is incorporated by reference herein in its entirety.

FIELD OF THE INVENTION

The present invention relates to data processing systems and more particularly relates to determining the quality of merchant supplied enhanced data related to financial transactions that are performed by holders of financial presentation devices presentable to a plurality of merchants.

BACKGROUND OF THE INVENTION

Conventionally, when a financial presentation device, such as a credit card or debit card is used in a transaction, a primary transaction data record is generated that includes the payment amount, the date of transaction, and merchant information (name, city, state and ZIP code). To an ever great extent, financial presentation device service networks ('financial service networks') such as Visanet acquire additional transactional information referred to as 'enhanced data' or 'enhanced transaction data'. Enhanced data, often described as either Level II or Level III data, is any non-financial data beyond the primary transaction data and includes invoice level and line item details. This data allow issuers and their corporate clients to obtain line item detailed information about their employees' travel and business expenditures. For example, for a lodging transaction, enhanced data may include such data as a daily room rate, tax amount, telephone charges, gift shop purchases, movie charges, laundry charges, check-in date, check-out date, mini-bar charges, parking and valet charges and the like. The enhanced data is collected at the merchant point-of-sale but may be delivered through the financial service network in a different form and/or at a different time from the primary transaction record generated at the point of sale. In general, enhanced data may be delivered to a financial service network directly from merchants, from acquirers associated with the merchants, and through data consolidators that gather data from the merchants and/or acquirers.

Owing to the large number of different types and categories of enhanced data and the different entities which gather it, enhanced data arrives at data depositories of the financial services networks in a wide variety of different data formats with varying levels of completeness and accuracy, which has made it difficult to assess the quality of the enhanced data received. For instance, enhanced data records from some sources may contain a large number of data anomalies including missing data fields misplaced data, incorrect data formats, etc.

Therefore, it would be desirable to accurately determine the quality of the enhanced data.

SUMMARY OF THE DISCLOSURE

According to a first aspect, the present invention provides a system for determining the quality of merchant supplied enhanced data related to financial transactions that are performed by holders of financial presentation devices presentable to a plurality of merchants. The system includes a memory storing a plurality of enhanced transaction data (ETD) records with each ETD record having a plurality of fields. The memory also stores quality check criteria for determining the quality of enhanced data contained in the ETD records. The system also includes a processor coupled to the memory and a quality determination module executable by the processor and adapted to determine a quality of the plurality of ETD records based on the stored quality check criteria.

According to a second aspect, the present invention provides a method for determining the quality of merchant supplied enhanced data related to financial transactions that are performed by holders of financial presentation devices presentable to a plurality of merchants, the method includes storing in a computer memory a plurality of enhanced transaction data (ETD) records having a plurality of fields and quality check criteria for determining the quality of enhanced data contained in the ETD records. The method also include determining, using the computer, a quality of the plurality of ETD records based on the stored quality check criteria and storing the determined quality of the plurality of ETD records in the computer memory.

According to a third aspect, the present invention provides a system for determining the quality of merchant supplied enhanced data related to financial transactions that are performed by holders of financial presentation devices presentable to a plurality of merchants. The system comprises a memory storing a plurality of enhanced transaction data (ETD) records with each ETD record having a plurality of fields, the memory further storing quality check criteria for determining the quality of enhanced data contained in the ETD records. The system also includes a processor coupled to the memory and a quality determination module executable by the processor and adapted to determine a quality of enhanced data contained in selected fields of ETD records based on the stored quality check criteria and determine an overall quality of a plurality of ETD records according to the determined quality of enhanced data in the selected fields of each of the ETD records.

DETAILED DESCRIPTION

For purposes of illustration and clarity, the present invention will be discussed in the context of using a credit card. However, persons of ordinary skill in the art will appreciate that the novel features disclosed herein apply to all types of portable financial presentation devices including, but not limited to, credit cards, debit cards, prepaid cards, electronic benefit cards, charge cards, virtual cards, smart cards, key chain devices, personal digital assistants, cell phones, stored value devices or the like so long as the device can be presented to a seller of goods or services for payment.

As noted above, when a commercial or financial transaction is performed with a financial presentation device a 'primary' transaction data record is generated that includes information related to the transaction. This information, which includes the payment amount, the date of transaction, and merchant information (name, city, state and ZIP code), is referred to as Level I data. The transaction data record is transmitted to and eventually stored in the financial service network (e.g., Visanet) and the issuer that issued the presentation device.

Financial service networks encourage merchants to participate in 'enhanced data programs' to obtain more detailed transactional information that can be used for marketing and other purposes. Certain merchants, particularly retail/business-to-business, temporary help services, shipping and overnight courier services, fuel locations, hotel and hospitality services, airline and travel services, and automobile renters, are typical participants in enhanced data programs who include enhanced data in transaction data records or otherwise transmit enhanced data related to card transactions to the financial services network (either directly or via acquirers or data consolidators). Other merchants are participating in enhanced data programs with greater prevalence. In whichever mode the financial service network receives the enhanced data, the financial service network stores the enhanced data in association with the primary transaction data record as 'enhanced transaction data records' ('ETD records').

There are two categories of enhanced data: Level II and Level III. Level II data includes a merchant tax ID, and a Purchase ID. In addition, Level II records also may include transaction sales tax, a local tax indicator, and a customer code. Level III data also includes the tax ID and merchant category code (MCC), but further includes a merchant type code and full line item details. However, some merchants include further 'line item-like' details in Level II data. For example, some car rental agencies include customer driver ID, and fuel type, quantity and unit cost in Level II data; similarly, Level II data received from airlines and/or travel agents includes an original airline ticket number, passenger name, departure date, and airport code (among other information). Thus, while Level III data is generally more expansive and detailed than Level II data, both can include a large amount of data that are associated with the original transactions.

Another variation of enhanced data is level III summary data which contains a summary or a portion of level III data.

In light of the potentially large amount of transaction information involved, some Level II and Level III data record types contain a large number of data fields. For example, Visa data record TC05-TCR3, which is used to store passenger itinerary data for airlines transactions, includes more than twenty fields just for ticket related information. Given the variety of data sources and record types, and the enormous amount of transaction-related information involved in the enhanced data program, there are a corresponding variety of ways in which errors can occur. Taking the TC05-TCR3 record type as an illustrative example, the record specification calls for positions 56 and 57 of the record to contain a carrier code. A travel agent merchant may have a data acquisition system that is only partially complete in that it may not enter the carrier code each time it records a transaction. Thus, in this example, the merchant may compile a TC05-TCR3 record in which the carrier code field (positions 56 and 57) include no data, or include some other, non-carrier code data. Given the large scope of the enhanced data program, such errors and inaccuracies have been found to occur, giving rise to the need to test the quality of ETD records.

According to the present invention, for each ETD record type, quality check criteria used to test the data quality of each field of the ETD record are created and stored. A computer system is used to test the quality of data of each ETD record by determining whether the data in the fields of the ETD records meet the quality check criteria. The data in a particular field of an ETD record will either pass or fail the test. Depending on the number of selected fields that pass the quality check criteria test, each ETD record is given a quality rating. In some embodiments, there are three quality ratings: low, medium and high. Using this method and system, the overall quality of all ETD records received from a source or from a category of merchants (MCG) may be determined. From the overall quality determination, those sources or categories that provide lower quality enhanced data may be ascertained, and steps to remedy or improve the quality from such source or categories may be taken.

Figure 1:
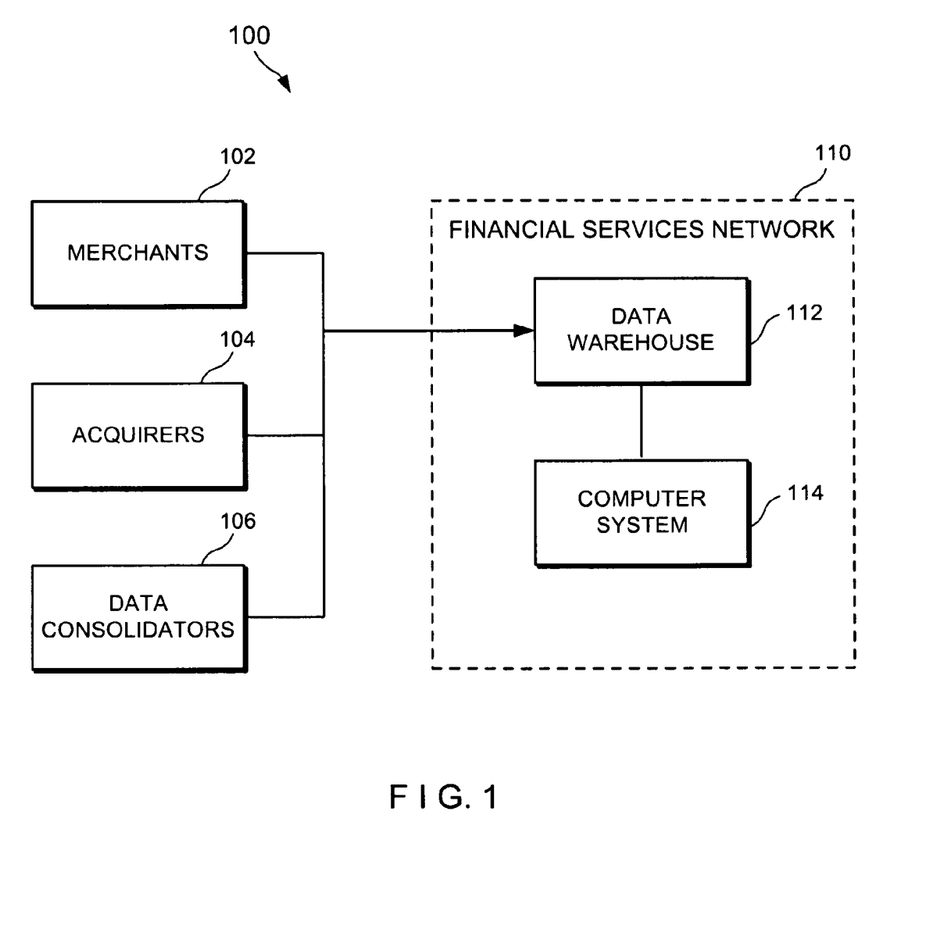
FIG. 1 is a block diagram of an exemplary system for determining the quality of merchant supplied enhanced data related to financial transactions according to an embodiment of the present invention.

FIG. 1 shows a block diagram illustrating how the enhanced data are gathered according to the invention. Merchants 102, which include all providers of goods and services that accept financial presentation devices as a payment method, collect enhanced data related to transactions they participate in involving financial presentation devices, and in some cases may store the data in ETD record formats. The merchants 102 may transmit the ETD records directly to a financial service network 110. Some merchants 102 that collect enhanced data regarding transactions performed using financial presentation devices may not store the enhanced data in a ETD record format, or transmit the enhanced data directly to the financial service network 110; such merchants may instead supply the enhanced data in alternative forms (e.g., raw data files) to their acquirers 104, the financial institutions with which the merchants 102 deal directly in credit card transactions, or to data consolidators 106 which, among other services, gather enhanced data from a plurality of services and organize the data in useful data formats.

The merchants 102, the acquirers 104 and the data consolidators 106 are communicatively coupled, e.g., via a data or telephone network a financial service network 110, such as Visanet. The financial services network 110 includes a data warehouse 112 for receiving the ETD records from the merchants 102, acquirers 104 and data consolidators 106, and a computer system 114 that is adapted to perform the ETD record quality determination according to the present invention.

Figure 2:
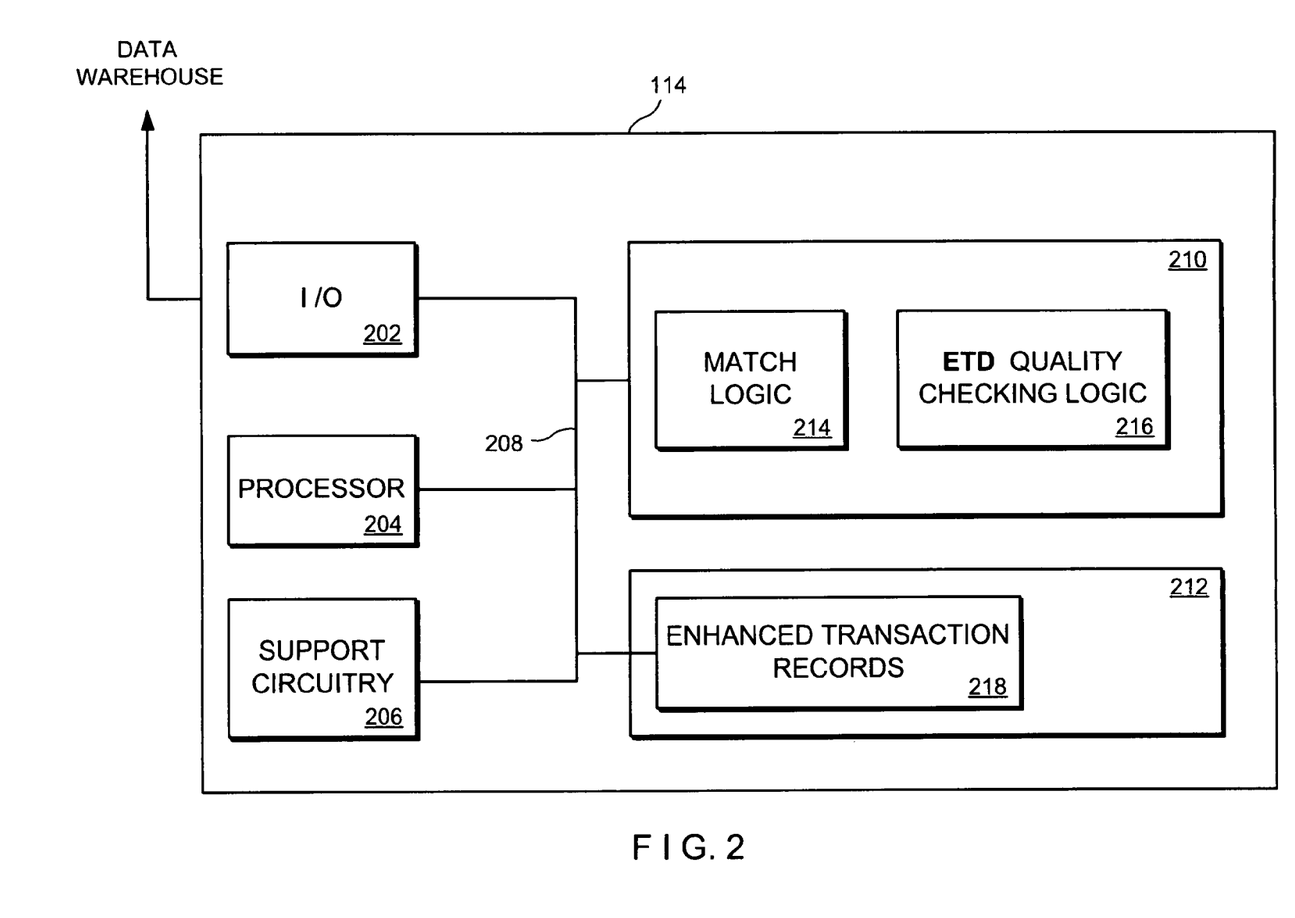
FIG. 2 is a block diagram of an exemplary computer system of a financial service network adapted to execute an enhanced transaction data quality check module according to an embodiment of the present invention.

Referring now to FIG. 2, a block diagram of an exemplary computer system 114 (shown in FIG. 1) including code for determining the quality of merchant supplied enhanced data related to financial transactions is shown. The computer 114 includes a processor 204, such as a central processing unit (CPU), a support circuitry 206 and an I/O interface 202 which sends/receives information via a communication link to other computer systems such as the data warehouse 112. The processor 204, I/O interface 202 and support circuitry 206 are commonly connected to a bus 208 which also connects to program storage memory 210 and data storage memory 212.

The program storage memory 210 and data storage memory 212 may each comprise volatile (RAM) and non-volatile (ROM) memory units and may also comprise hard disk and backup storage capacity. The program data memory 210 stores software program modules and associated data, and in particular stores a match logic module 214 and an ETD quality checking module (quality determination module) 216. The match logic module 214 is adapted to match received primary Level I transaction data records with separately received ETD records 218, which are stored in data storage memory 212. The match logic module 214 may flag ETD transaction data records that match with primary Level transaction data records. A list of flagged transaction data records may either be provided directly to the ETD quality checking module 216 or stored in data storage memory 212. The ETD quality checking module 216, the operation of which is described in greater detail below, utilizes stored quality check criteria stored in program storage memory 210 to test the enhanced data in the flagged ETD records. Software program modules in the program storage memory 210 and data from the data storage portion 212 are transferred from memory on as-needed basis as directed by the processor 204.

It is to be appreciated that the computer system 114 can be any computer such as a personal computer, minicomputer, workstation, mainframe, or a combination thereof. While the computer system 114 is shown, for illustration purposes, as a single computer unit, the system may comprise a group/farm of computers which can be scaled depending on the processing load and database size.

Figure 3:
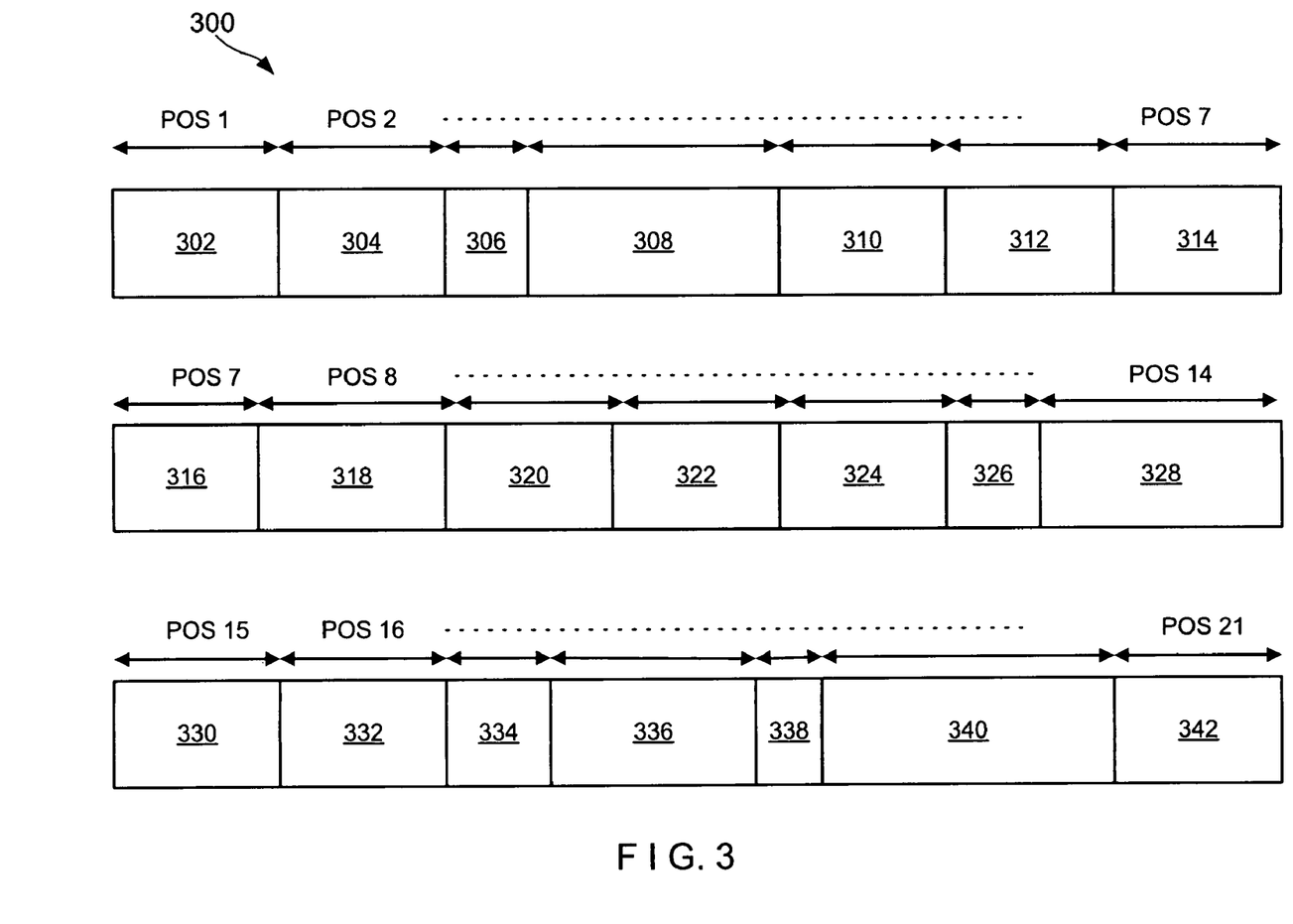
FIG. 3 is a diagram of an exemplary enhanced transaction data record.

Referring now to FIG. 3, an example data structure of an ETD record 300 is shown. The enhanced transaction record 300 shown, which may be a Level II or Level III record, includes twenty-one separate data fields 302-342 (actual data is not shown). The data fields 302-342 may be configured to contain different quantities of data (as measured in bytes, for example). Thus, the data contained in field 302 may occupy bytes one (1) through eight (8) of record 300; in FIG. 3, bytes one through eight are collectively labeled as POS 1 (which stands for position 1). Likewise, the positions occupied by the data of the other twenty fields 304-342 are labeled POS 2 through POS 21. Generally speaking the fields of enhanced data records store alphanumeric data, although it is envisioned that other types of data can be used. For example, the TC05-TCR3 Level II record mentioned above, that is used to store passenger itinerary data includes a passenger name field designed to store up to twenty alphanumeric characters that occupies locations (e.g., bytes) 27 to 46 of the record, and a departure date field designed to store data in an MMDDYY format that occupies locations 47 to 52 of the record.

Figure 4:
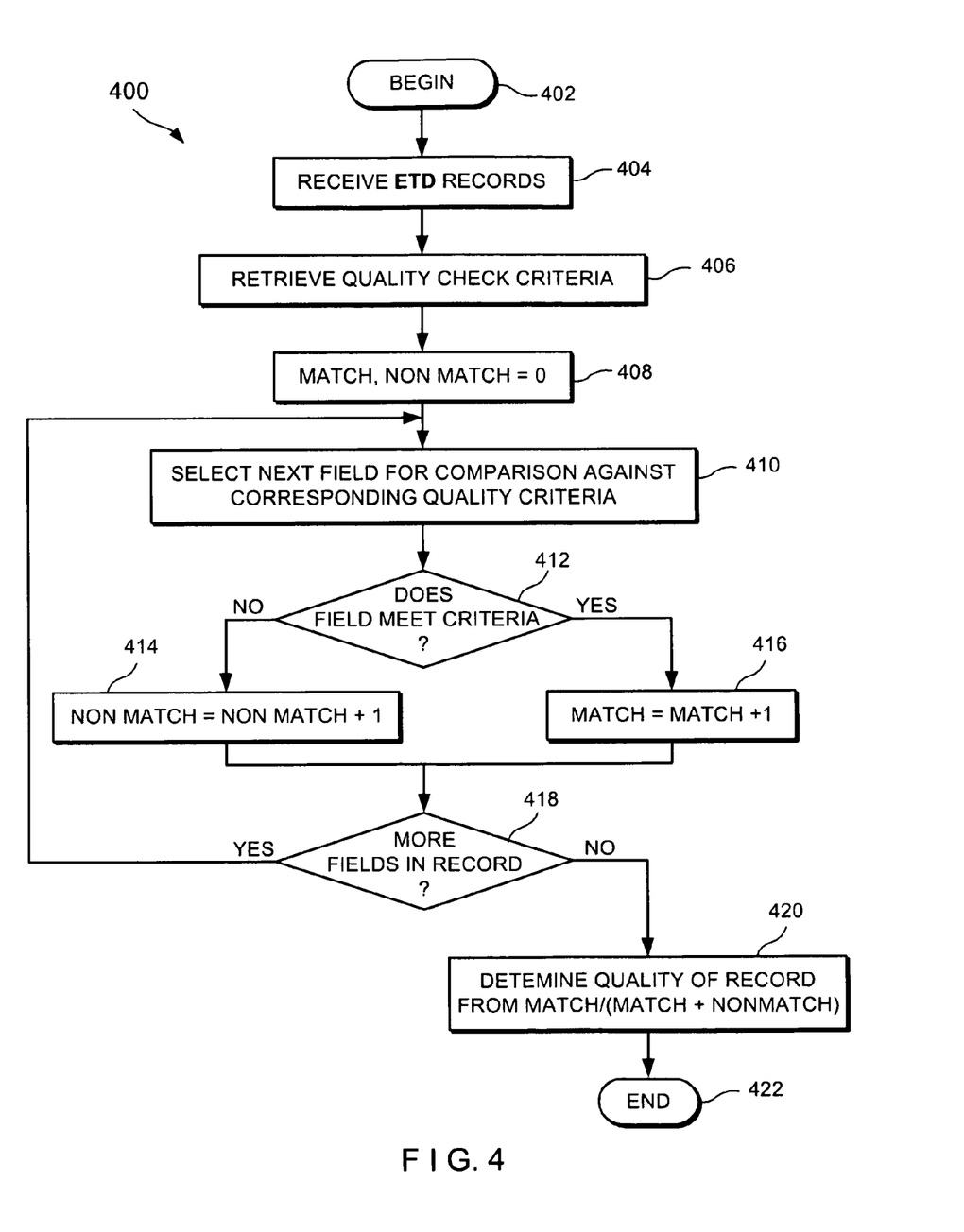
FIG. 4 is a flow chart of an exemplary method for determining the quality of merchant supplied enhanced data related to financial transactions according to an embodiment of the present invention.

Referring now to FIG. 4, a flow chart of an exemplary method 400 of determining the quality of merchant supplied enhanced data related to financial transactions is shown. The method begins in step 402. In step 404, an ETD record is received by the ETD quality check module 216 from data storage memory 212. In step 406, the quality check criteria for the record type of the ETD record are retrieved from program storage memory 210. Counters for the number of matched (MATCH) and unmatched (NON-MATCH) fields are initially set to zero in step 408. In step 410, the data within the next field (which starts out as the first field when the method begins) of the ETD record is selected field for comparison against the corresponding quality check criteria for that field. The quality check criteria provide conditions (on a field-by-field basis) under which data contained in each of the fields of an ETD record will pass or fail. Thus, in step 412, it is determined whether the data of the selected meets the corresponding quality check criteria. Reference is now made to Table I below which lists example quality check criteria of three fields of a Level III TC50-TCR0 Commercial Card-Passenger Itinerary Data ETD record.

TABLE 1

| FIELD POSITION | FIELD DESCRIPTION | QUALITY CHECK CRITERIA |
| --- | --- | --- |
| 23-37 | Message Identifier | Must be 13 digits |
| 165 | Internet Indicator | Must be Y/N value |
| 166 | Electronic Ticket Indicator | If field 165 is "Y" then field must have alphanumeric value |

According to the quality check criteria shown in Table 1, if the data within the Message Identifier field located in positions 23-37 of the TC50-TCR0 record does not contain 13 digits, then the data within the Message Identifier field will fail the test. Similarly, if the data within the Internet Indicator field, which is used to show whether the ticket was purchased over the internet, is not a "Y" or an "N", the data in the Internet Indicator will fail the test, and if a "Y" is contained in the Internet Indicator field, and the Electronic Ticket Indicator field does not contain an alphanumeric value, then the data in the Electronic Ticket Indicator field will fail the test. Conversely, if the conditions provided by the quality check are met, then the data within the corresponding fields will pass the tests.

Returning again to FIG. 4, if the data of the selected field fails to meet the corresponding quality check criteria, the NON-MATCH counter is incremented by one in step 414. Otherwise, if the data of the selected field meets the corresponding quality check criteria, the MATCH counter is incremented by one in step in step 416. It is then determined whether there are more fields in the ETD record to test in step 418. If there are further fields to test, the method cycles back to step 410, and with each iteration, the MATCH or NON-MATCH counter increases by one. If it is determined that there are no further fields to test in step 418, in step 420 the final value of the MATCH counter is divided by the sum of the final values of the MATCH and NON-MATCH counters:

ETD RECORD QUALITY=MATCH/(MATCH+ NON-MATCH)

This quotient is then used as an index of the quality of the record. In one embodiment, if the quotient is between zero (0) and 0.5, the ETD record is given a low (L) quality rating. If the quotient is between 0.5 and 0.87, the ETD record is given a medium (M) quality rating, and if the quotient is above 0.87, the ETD record is given a high (H) quality rating. After the ETD record quality is determined, the method ends in step 422.

The method described with reference to FIG. 4 determines the quality of a single ETD record. Generally, what is desired is the overall or average level of quality of all of the ETD records received from a source, or pertaining to a particular industry or a particular record type. For example, it may be that a particular acquirer provides lower quality enhanced data than expected, that Level II records have higher quality data than Level III records across the board, or that airlines are providing high quality enhanced data on average while car rentals are providing medium or low quality data on average. These conclusions may be arrived at by aggregating the results of many iterations of the method described above.

Figure 5:
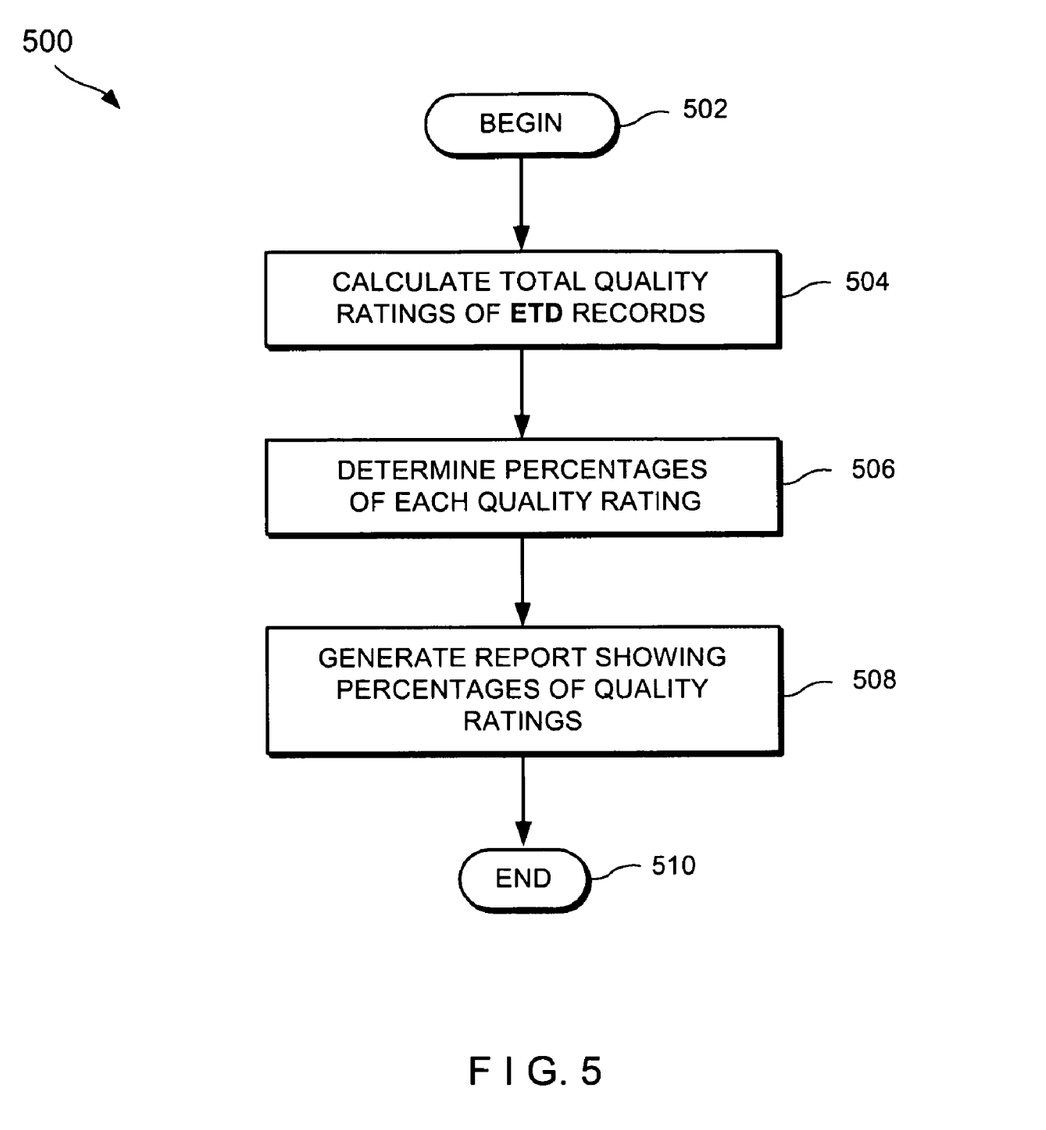
FIG. 5 is flow chart of an exemplary method for determining the overall quality of enhanced data grouped according to a category according to an embodiment of the present invention.

Referring to FIG. 5, a flow chart of a method 500 of aggregating ETD record quality check results for a given category (e.g., source, industry) is shown. In a first step 502 the total numbers of low, medium and high ETD record quality ratings for the given category are determined. For example, an acquirer may have provided 500 ETD records, of which 355 are determined to have a high quality rating, 100 a medium quality rating and 45 a low quality rating according to the method described above. In step 504, the percentages of each rating type for the category are calculated. Using the same example, in step 506 it is determined that 71 percent of the ETD records from the category are of high quality, 20% are of medium quality, and 9 percent are of low quality. These results are displayed in a report generated in step 508. The method ends in step 510.

Figure 6:
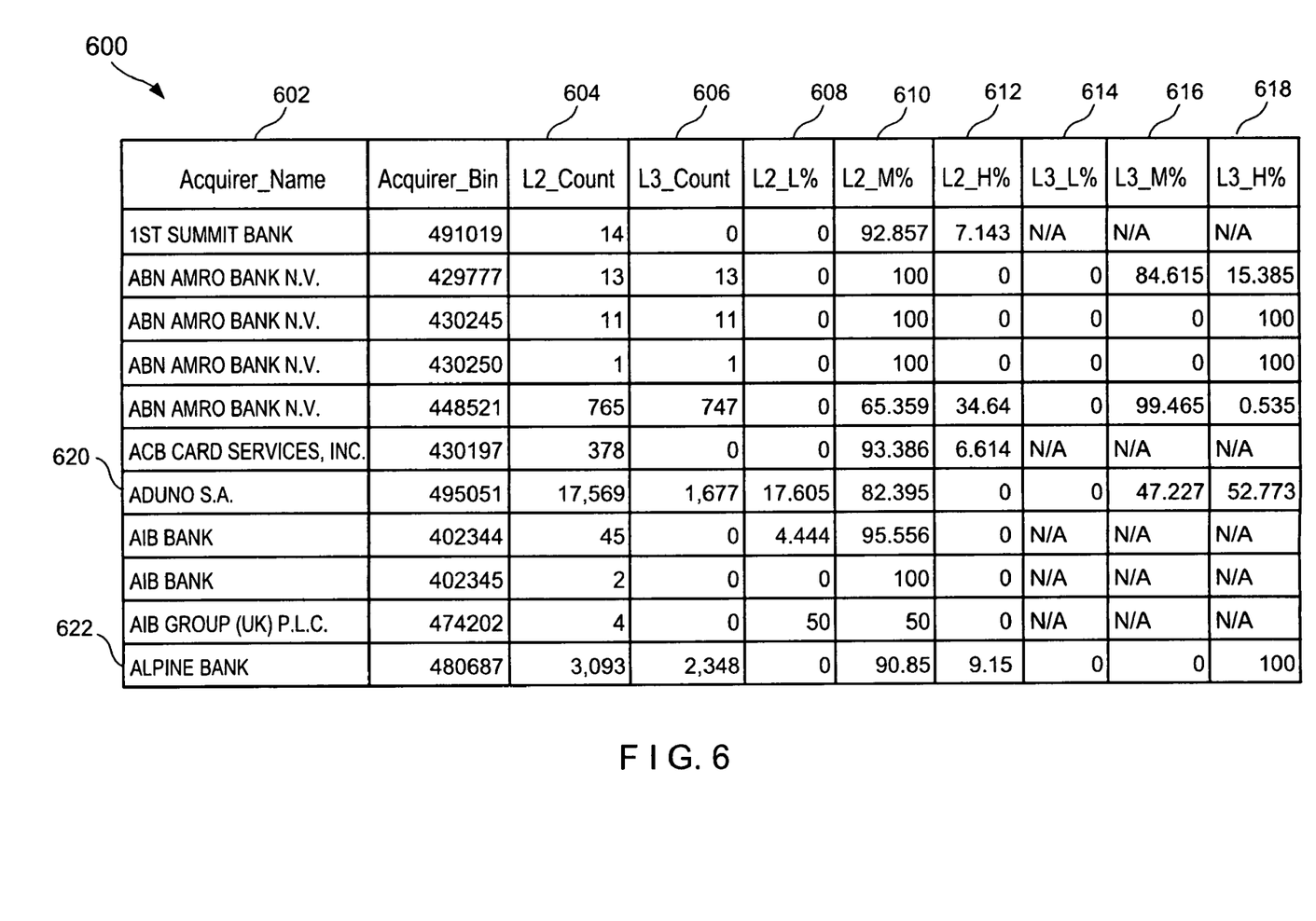
FIG. 6 is a report generated according to an embodiment of the present invention showing example ETD record quality statistics of a plurality of acquirers.

FIG. 6 is an exemplary report 600 showing acquirer ETD record quality that may be generated using information acquired by the system and method according to the present invention. In the report 600, a list of acquirers 602 is presented together with statistics pertinent to each of the acquirers. The statistics include L2_Count 604 and L3_Count 606 which are the number of Level II and Level III ETD records received from the acquirers respectively; the statistics also include L2_L % 608, L2_M % 610 and L2_H % 612, which are the percentage of low, medium and high quality Level II ETD records received from the acquirers, and L3_L % 614, L3_M % 616 and L3_H % 618, which are the percentage of low, medium and high quality Level III ETD records received from the acquirers.

The sample data provided in FIG. 6, which is merely exemplary and does not represent actual quality ratings for the acquirers listed, demonstrates substantial variability in the quality ratings of the enhanced data provided by the various acquirers. For example, the data for acquirer Aduno S. A., shown in row 620 indicates that over 17% of the Level II ETD records received from this source are of low quality, 82% are of medium quality, and none of high quality, whereas more than half the Level III data received from the same source are of high quality, 47% are of medium quality and none are of low quality. This and other data indicates that this source is providing Level III ETD records data of considerably higher quality that Level II ETD records. A similar skew toward higher quality Level III records is shown in the data of acquirer Alpine Bank shown in row 622 for which the Level II quality is 91% medium and 9% high, and the Level III quality is 100% high. This data shown in report 600 thus indicates an overall difference between Level II and Level III ETD record quality, and reasons for this difference may be sought.

Figure 7:
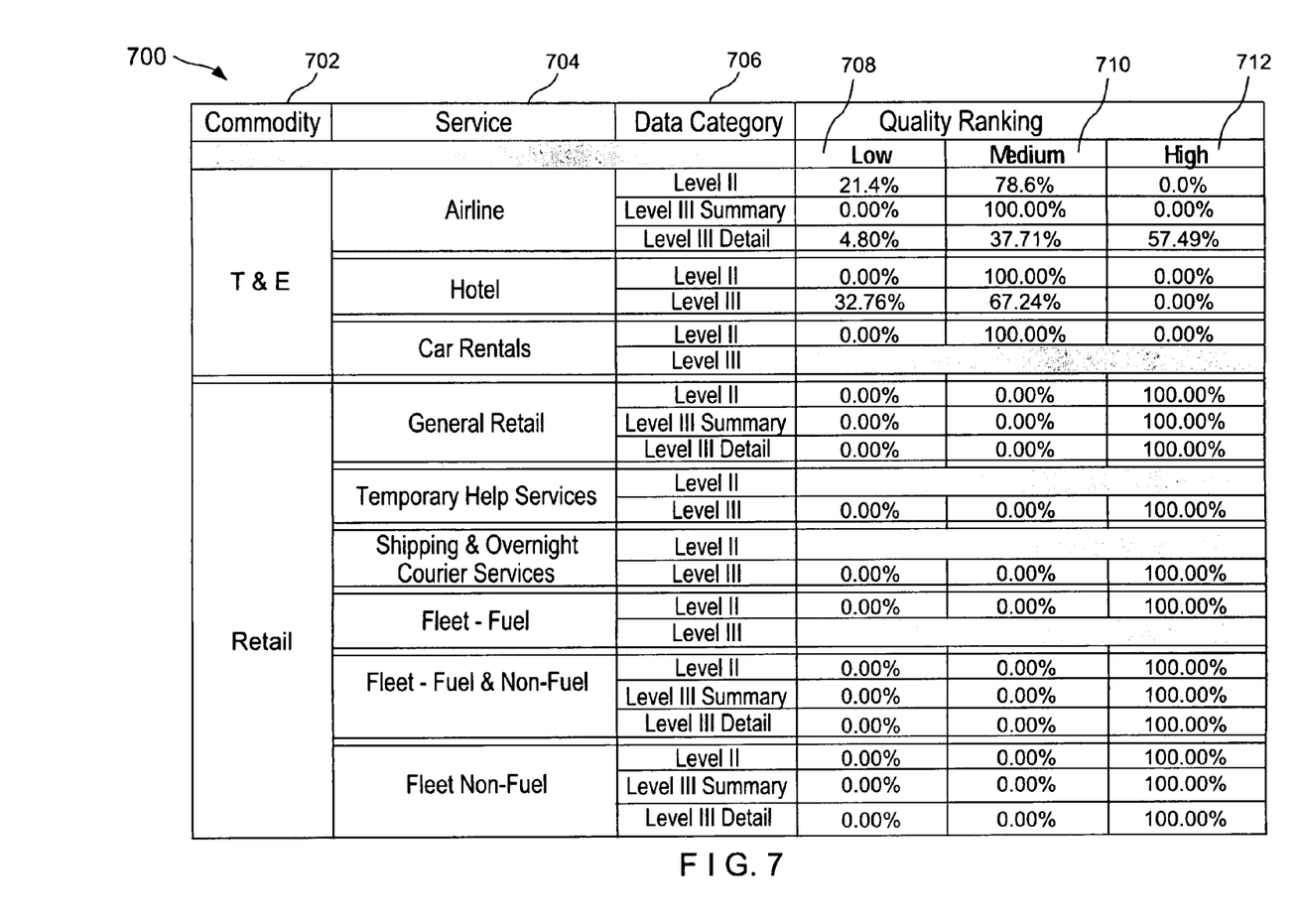
FIG. 7 is a report generated according to an embodiment of the present invention showing example ETD record quality statistics of a plurality of service categories.

FIG. 7 is another exemplary report 700 in this case showing ETD record quality organized by type of service provided. In the report 700, column 702 lists two broad service categories, T&E (Travel & Entertainment) and Retail. These broad categories are broken down into separate services in column 704: T&E includes Airline, Hotel and Car Rentals and Retail includes General Retail, Temporary Help Services, Shipping & Overnight Courier Services, and Fleet categories (Fuel, Fuel and Non_Fuel, and Non_Fuel). The services generate records in the different enhanced data categories shown in column 706, Level II, Level III and in some cases Level III Summary records. Columns 708, 710 and 712 list the percentages of low, medium and high quality records for each commodity/service/data category. For example, report 700 shows that 21.4% of Level II records including Airline details are of low quality, 78.6% are of medium quality and none are of high quality, whereas 4.8% of the airline_related Level III records are of low quality, 37.71% are of medium quality and 57.49% are of high quality. As in report 600, report 700 indicates that for airlines, Level III records are of higher quality that Level II records. However, the report also shows that for hotel_related enhanced data, 100% of the Level II records are of medium quality, while 32.76% of the Level III records are of low quality, and the remaining 67.24% are of medium quality. This indicates that hotel_related records show a different quality pattern in that the Level II records are of higher quality than the Level III records. This and other data may be useful in determining where consistent compliance with enhanced data programs may be lacking.

Numerous other reports may be generated using quality information obtained according to the present invention in addition to those shown in FIGS. 6 and 7 including, for example, reports showing quality according to record type and merchant category group (MCG), for example.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system for determining the quality of merchant supplied enhanced data related to financial transactions performed by holders of financial presentation devices that are presentable to a plurality of merchants for purchasing items of goods or services, the system comprising:
 a memory storing a plurality of enhanced transaction data (ETD) records with each ETD record having a plurality of fields, the memory further storing quality check criteria for determining the quality of enhanced transaction data contained in the ETD records without regard to the items purchased, wherein the quality check criteria contains for each selected field a condition which the each selected field either passes or fails and wherein at least one of the conditions contained in the quality check criteria is whether a particular field contains an alphanumeric value;
 a processor coupled to the memory;
 a quality determination module executable by the processor and adapted to determine a quality rating of the plurality of ETD records based on the stored quality check criteria;
 wherein for each ETD record the quality determination module:
  determines a quality of data contained in selected fields of the each ETD record based on the stored quality check criteria for each ETD record;
  determines an overall quality of the plurality of ETD records according to the determined quality of data for each of the ETD records; and
  determines the quality of data contained in the each ETD record based on the number of selected fields that pass the conditions of the quality check criteria.

2. The system of claim 1, wherein the quality of each ETD record is categorized as one of low quality, medium quality and high quality, and the quality determination module is adapted to determine a total number of ETD records that are categorized as low quality, medium quality and high quality.

3. The system of claim 1, wherein the ETD records are received from a plurality of different sources and for each source the quality determination module:

for each ETD record, determines a quality of data contained in selected fields of the each ETD record based on the stored quality check criteria; and determines an overall quality of the plurality of ETD records according to the determined quality of data for each of the ETD records.

4. The system of claim 3, wherein the quality of each ETD record is categorized as one of low quality, medium quality and high quality, and the quality determination module is adapted to determine a total number of ETD records that are categorized as low quality, medium quality and high quality for the ETD records from each source.

5. The system of claim 1, wherein the quality determination module is further adapted to generate a report showing percentages of low quality, medium quality and high quality ETD records according to merchant category group (MCG) of the ETD records.

6. The system of claim 1, wherein the ETD records contain at least one of level II and level III enhanced transaction data.

7. The system of claim 6, wherein the quality determination module is further adapted to generate a report showing the quality of data in the level II and the level III data of the ETD records.

8. A method for determining the quality of merchant supplied enhanced data related to financial transactions performed by holders of financial presentation devices that are presentable to a plurality of merchants for purchasing items of goods or services, the method comprising:

storing in a computer memory:
i) a plurality of enhanced transaction data (ETD) records having a plurality of fields, the ETD records including records for a plurality of merchants and a plurality of holders of the financial presentation devices; and
ii) quality check criteria for determining the quality of enhanced transaction data contained in the ETD records without regard to the items purchased;

determining, for each ETD record, a quality of data contained in selected fields of the each ETD record based on the stored quality check criteria wherein the quality check criteria contains for each field a condition which the each field either passes or fails;

determining an overall quality of the plurality of ETD records according to the determined quality of data for each of the ETD records;

determining the quality of data contained in the each ETD record based on the number of the selected fields that pass the conditions of the quality check criteria wherein one of the conditions contained in the quality check criteria is whether a particular field contains an alphanumeric value;

determining, using the computer, a quality rating of the plurality of ETD records based on the stored quality check criteria; and storing the determined quality of the plurality of ETD records in the computer memory.

9. The method of claim 8, further comprising:
determining the quality of each ETD record as one of low quality, medium quality and high quality; and
determining a total number of ETD records that are categorized as low quality, medium quality and high quality.

10. The method of claim 8, wherein the ETD records received from a plurality of different sources and for each source for each ETD record, and the method further comprises:

determining a quality of data contained in selected fields of the each ETD record based on the stored quality check criteria; and determining an overall quality of the plurality of ETD records according to the determined quality of data for each of the ETD records.

11. The method of claim 10, further comprising:
categorizing the quality of each ETD record is as one of low quality, medium quality and high quality, and
determining a total number of ETD records that are categorized as low quality, medium quality and high quality for the ETD records from each source.

12. The method of claim 8, further comprising: generating a report showing percentages of low quality, medium quality and high quality ETD records according to merchant category group (MCG) of the ETD records.

13. The method of claim 8, wherein the ETD records contain at least on of level II and level III enhanced transaction data.

14. The method of claim 13, further comprising:
generating a report showing the quality of data in the level II and the level III data of the ETD records.

15. A system for determining the quality of merchant supplied enhanced data related to financial transactions performed by holders of financial presentation devices that are presentable to a plurality of merchants for purchasing items of goods or services, the system comprising:

a memory storing a plurality of enhanced transaction data (ETD) records with each ETD record having a plurality of fields, the memory further storing quality check criteria for determining the quality of enhanced data contained in the ETD records without regard to the items purchased;

a processor coupled to the memory; and a quality determination module executable by the processor and adapted to:

determine a quality of enhanced transaction data contained in selected fields of ETD records based on the stored quality check criteria wherein the quality check criteria contains for each field a condition which the each field either passes or fails and wherein one of the conditions contained in the quality check criteria si whether a particular field contains a specific alphanumeric value;

determine for each ETD record the quality of data contained in the each ETD record based on the number of the selected fields that pass the conditions of the quality check criteria;

determine an overall quality rating of a plurality of ETD records according to the determined quality of enhanced data in the selected fields of each of the ETD records.

16. The system of claim 15, wherein the quality of each ETD record is categorized as one of low, medium and high, and the quality determination module is adapted to determine a total number of ETD records that are categorized as low, quality, medium quality and high quality.

17. The system of claim 15, wherein the ETD records are received from a plurality of sources and for each source the quality determination module:

for each ETD record, determines a quality of data contained in selected fields of each ETD record based on the stored quality check criteria; and determines an overall quality of the plurality of ETD records according to the determined quality of data for each of the ETD records.

18. The system of claim 17, wherein the quality of each ETD record is categorized as one of low, medium and high, and the quality determination module is adapted to determine a total number of ETD records that are categorized as low, quality, medium quality and high quality for the ETD records from each source.

19. The system of claim 16, wherein the quality determination module is further adapted to generate a report showing percentages of low quality, medium quality and high quality ETD records according to merchant category group (MCG) of the ETD records.

20. The system of claim 15, wherein the ETD records include at least one of level II and level III transaction data.

21. The system of claim 15, wherein the quality determination module is further adapted to generate a report showing the quality of data in the level II and the level III data of the ETD records.

22. A system for determining the quality of merchant supplied enhanced data related to financial transactions performed by holders of financial presentation devices that are presentable to a plurality of merchants for purchasing items of goods or services, the system comprising:
  a memory storing a plurality of enhanced transaction data (ETD) records with each ETD record having a plurality of fields, the memory further storing quality check criteria for determining the quality of enhanced transaction data contained in the ETD records without regard to the items purchased wherein the ETD records contain at least one of level II and level III enhanced transaction data;
  a processor coupled to the memory; and
  a quality determination module executable by the processor and adapted to determine a quality rating of the plurality of ETD records based on the stored quality check criteria;
    wherein for each ETD record the quality determination module:
      determines a quality of data contained in selected fields of the each ETD record based on the stored quality check criteria for each ETD record;
      determines an overall quality of the plurality of ETD records according to the determined quality of data for each of the ETD records; and
    wherein the quality determination module is further adapted to generate a report showing the quality of data in the level II and the level III data of the ETD records.

23. A method for determining the quality of merchant supplied enhanced data related to financial transactions performed by holders of financial presentation devices that are presentable to a plurality of merchants for purchasing items of goods or services, the method comprising:
  storing in a computer memory:
    i) a plurality of enhanced transaction data (ETD) records having a plurality of fields, the ETD records including records for a plurality of merchants and a plurality of holders of the financial presentation devices and wherein the ETD records contain at least one of level II and level III enhanced transaction data; and
    ii) quality check criteria for determining the quality of enhanced transaction data contained in the ETD records without regard to the items purchased;
  determining, for each ETD record, a quality of data contained in selected fields of the each ETD record based on the stored quality check criteria;
  determining an overall quality of the plurality of ETD records according to the determined quality of data for each of the ETD records;
  determining, using the computer, a quality rating of the plurality of ETD records based on the stored quality check criteria;
  storing the determined quality of the plurality of ETD records in the computer memory; and
  generating a report showing the quality of data in the level II and the level III data of the ETD records.

24. A system for determining the quality of merchant supplied enhanced data related to financial transactions performed by holders of financial presentation devices that are presentable to a plurality of merchants for purchasing items of goods or services, the system comprising:
  a memory storing a plurality of enhanced transaction data (ETD) records with each ETD record having a plurality of fields, the memory further storing quality check criteria for determining the quality of enhanced data contained in the ETD records without regard to the items purchased;
  a processor coupled to the memory; and
  a quality determination module executable by the processor and adapted to:
    determine a quality of enhanced transaction data contained in selected fields of ETD records based on the stored quality check criteria wherein the ETD records include at least one of level II and level III transaction data;
    determine an overall quality rating of a plurality of ETD records according to the determined quality of enhanced data in the selected fields of each of the ETD records; and
    generate a report showing the quality of data in the level II and the level III data of the ETD records.

* * * * *